(12) United States Patent
Sampson (10) Patent No.: US 9,482,369 B2
(45) Date of Patent: Nov. 1, 2016

(54) WRAP BRACKET DAMPER ASSEMBLY

(71) Applicant: Franklin Fastener Company, Redford, MI (US)

(72) Inventor: James M. Sampson, Southfield, MI (US)

(73) Assignee: Franklin Fastener Company, Redford, MI (US)

( * ) Notice: Subject to any disclaimer, the term of this patent is extended or adjusted under 35 U.S.C. 154(b) by 19 days.

(21) Appl. No.: 14/245,394

(22) Filed: Apr. 4, 2014

(65) Prior Publication Data

US 2014/0299722 A1 Oct. 9, 2014

Related U.S. Application Data

(63) Continuation-in-part of application No. 12/731,940, filed on Mar. 25, 2010, now Pat. No. 8,870,132.

(60) Provisional application No. 61/163,106, filed on Mar. 25, 2009.

(51) Int. Cl.

| *F16L 3/00* | (2006.01) |
| *F16L 3/10* | (2006.01) |
| *F16L 3/123* | (2006.01) |
| *F16L 3/127* | (2006.01) |
| *F16L 3/237* | (2006.01) |
| *F16L 55/035* | (2006.01) |

(52) U.S. Cl.
CPC .............. *F16L 3/1058* (2013.01); *F16L 3/123* (2013.01); *F16L 3/127* (2013.01); *F16L 3/237* (2013.01); *F16L 55/035* (2013.01); *Y10T 29/49947* (2015.01)

(58) Field of Classification Search
USPC ............ 248/62, 63, 71, 73, 74.1, 74.3, 74.4; 24/530, 542, 543
See application file for complete search history.

(56) References Cited

U.S. PATENT DOCUMENTS

| 1,805,006 A | 5/1931 | Neilon |
| 2,455,598 A | 12/1948 | Michalenko |
| 2,466,912 A | 4/1949 | Rice |
| 2,466,921 A | 4/1949 | Tinnerman |
| 3,421,187 A | 1/1969 | Ryder |
| 3,815,855 A | 6/1974 | Appleton |

(Continued)

FOREIGN PATENT DOCUMENTS

| JP | 62124335 A | 6/1987 |
| JP | 62184296 A | 8/1987 |

OTHER PUBLICATIONS

Non-Final Rejection dated Mar. 26, 2015, U.S. Appl. No. 14/523,084, filed Oct. 24, 2014.

*Primary Examiner* — Steven Marsh
(74) *Attorney, Agent, or Firm* — Brooks Kushman P.C.

(57) ABSTRACT

A damper assembly is provided with a grommet and a tubular clamp. The grommet includes a split tubular body that defines a substantially cylindrical cavity for receiving an elongated member. The split tubular body includes an oblong projection that extends radially outward. The tubular clamp defines a cavity for receiving the grommet within. The tubular clamp includes an axially extending gap and a slot formed through, wherein the slot is sized for receiving the oblong projection for locating the grommet to the tubular clamp. Wherein a longitudinal length of the grommet extends substantially beyond a length the tubular clamp for damping vibration of the elongated member.

18 Claims, 9 Drawing Sheets

(56) References Cited

U.S. PATENT DOCUMENTS

| | | |
|---|---|---|
| 4,037,810 A | 7/1977 | Pate |
| 4,172,578 A | 10/1979 | Pate |
| 4,189,807 A | 2/1980 | Byerly |
| 4,252,289 A | 2/1981 | Herb |
| 4,991,801 A | 2/1991 | Trumbull |
| 5,056,763 A | 10/1991 | Hamada et al. |
| 5,435,506 A | 7/1995 | Wiley |
| 5,971,330 A | 10/1999 | Noba |
| 6,152,412 A | 11/2000 | Basickes et al. |
| 6,164,604 A | 12/2000 | Cirino et al. |
| 6,398,170 B1 | 6/2002 | Wada |
| 6,581,267 B1 | 6/2003 | Olbrich |
| 6,732,982 B1 | 5/2004 | Messinger |
| 6,732,983 B1 | 5/2004 | Blake et al. |
| 6,892,990 B2 | 5/2005 | Pisczak |
| 7,467,767 B2 | 12/2008 | Miles et al. |
| 7,540,071 B2 | 6/2009 | Sampson |
| 7,546,986 B2 | 6/2009 | Kim |
| 7,770,848 B2 | 8/2010 | Johnson et al. |
| 7,959,114 B2 | 6/2011 | Spreitzer et al. |
| 8,091,839 B2 | 1/2012 | Whipple |
| 8,439,317 B2 | 5/2013 | Sampson |
| 8,973,880 B2 | 3/2015 | Goffman |
| 2005/0098688 A1 | 5/2005 | Miarka et al. |
| 2007/0257161 A1 | 11/2007 | Geppert et al. |
| 2010/0219301 A1 | 9/2010 | Sampson |
| 2010/0243855 A1 | 9/2010 | Sampson |

WRAP BRACKET DAMPER ASSEMBLY

CROSS-REFERENCE TO RELATED APPLICATIONS

This application is a continuation-in-part of U.S. application Ser. No. 12/731,940 filed Mar. 25, 2010, which, in turn, claims the benefit of U.S. provisional Application No. 61/163,106 filed Mar. 25, 2009, the disclosures of which are incorporated in their entirety by reference herein.

TECHNICAL FIELD

The field relates to clamps and dampers for elongated members such as tubes, pipes, hoses, ducts, lines, cables and harnesses.

BACKGROUND

Clamps are devices used to secure articles to a supporting surface. One type of clamp is a tube clamp, that is used to engage and secure a tubular article to a supporting surface. The tubular article may be a pipe, hose, duct, line, cable or harness. The supporting surface may be an engine block or chassis member for a vehicular application, or a wall or beam for an architectural application.

In vehicle applications clamps are used to secure hydraulic, pneumatic, mechanical and electrical tubes. Hydraulic tubes or lines are commonly used for a variety of systems including: brake systems, fuel systems, heating, ventilation and air conditioning (HVAC) systems and power steering systems. Common systems using pneumatic tubes or hoses include: lift, leveling and stabilizing systems. Mechanical tubes or cables are commonly used on a variety of systems including: hood and trunk release cables, parking brake cables and shifter cables. Electrical tubes or harnesses connect the various electrical systems and components on the vehicle including: power generation and storage, controllers and sensors. A variety of clamps are currently used to secure these tubes on a vehicle.

Metal clamps are often used for rigid attachment of heavy tubes in demanding environments, whereas plastic straps are often used for flexible attachments. A one piece metal clamp may be referred to as a wrap bracket. A wrap bracket may damage a tube if it is not properly assembled and does not properly engage the tube. If there is any clearance between the wrap bracket and the tube when retained, then noise or wear of the tube may develop over time. Plastic straps are elastic and conform to the exterior shape of a tube, which may prevent wear. However, plastic straps typically do not have the strength to support larger tubes and the plastic straps are not suited for high temperature applications.

Wrap bracket assemblies have been developed that include a liner or cushion that is disposed over a metal bracket (or multi-piece metal brackets) for applications requiring the high strength of a metal clamp and elasticity of a plastic strap. U.S. Pat. No. 2,466,921 to Tinnerman is an example of such a wrap bracket assembly.

Figure 19:
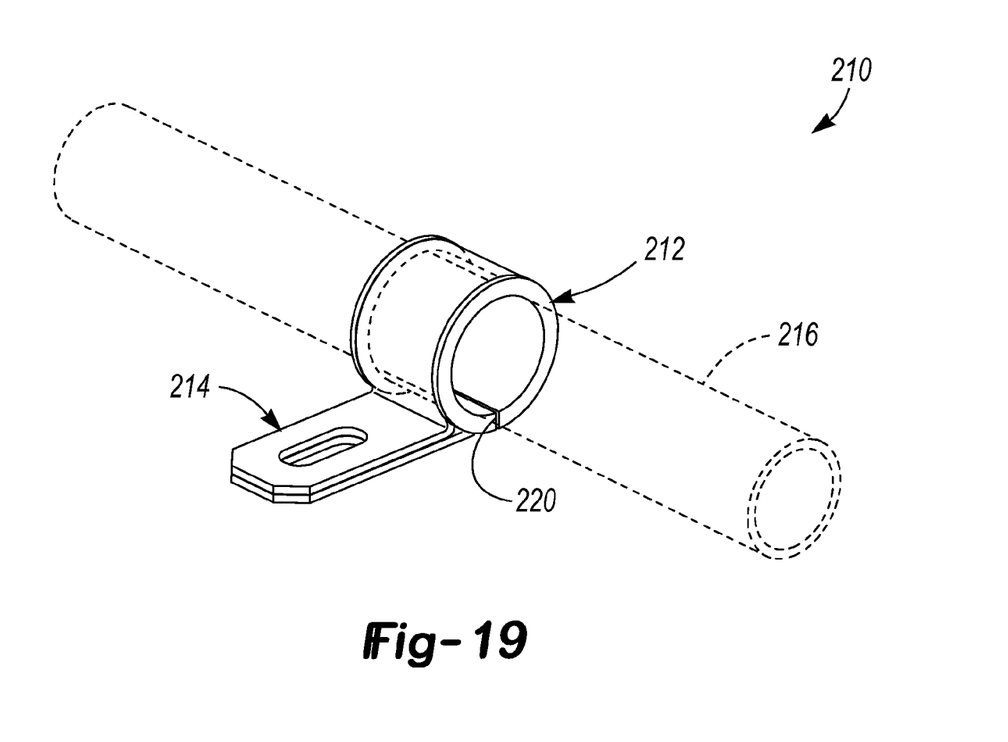
FIG. 19 is a side perspective view of a conventional wrap bracket assembly.

Other wrap bracket assemblies that include a grommet have been developed. One example of such a wrap bracket assembly is illustrated in FIG. 19 and referenced by numeral 210. The wrap bracket assembly 210 includes a grommet 212 and a wrap bracket 214 (or brackets). The grommet 212 is formed of an elastic material and conforms to the exterior of a tube 216. The grommet 212 is formed in a spool shape and includes a slot 220 that extend along its length. The wrap bracket 214 may be formed as single piece that wraps around the grommet 212 and anchors the tube 216 to a supporting surface.

One common approach for assembling such a wrap bracket assembly 210 includes shipping the metal bracket 214 along with the grommet 212 as individual components. A user then opens the grommet about the slot 220 and assembles the grommet 212 over the tube 216. Then the user assembles the wrap bracket 214 over the grommet 212, and anchors the wrap bracket assembly 210 to a supporting surface.

A damper is a device that deadens, restrains, or depresses. A tuned mass damper is a device that is mounted to a structure for reducing vibration. Japanese patent application JP 62124335 A to Suzuki et al. illustrates one example of a damper for a pipe.

SUMMARY

In at least one embodiment, a damper assembly is provided with a grommet and a tubular clamp. The grommet includes a split tubular body that defines a substantially cylindrical cavity for receiving an elongated member. The split tubular body includes an oblong projection that extends radially outward. The tubular clamp defines a cavity for receiving the grommet within. The tubular clamp includes an axially extending gap and a slot formed through, wherein the slot is sized for receiving the oblong projection for locating the grommet to the tubular clamp. Wherein a longitudinal length of the grommet extends substantially beyond a length the tubular clamp for damping vibration of the elongated member.

In another embodiment, a damper assembly is provided with a clamp and a grommet. The clamp is formed in a curved shape that defines a cavity and includes a slot that is formed through. The grommet is received within the cavity of the clamp, and includes a split tubular body that defines a substantially cylindrical cavity when oriented in a closed position for supporting a tube. The body having a projection extending radially outward therefrom and received by the slot for locating the grommet relative to the clamp. Wherein the grommet is formed in an open position with a cross-section that is greater than a corresponding cross-section of the cavity of the clamp such that the grommet elastically deforms when received within the cavity and is biased outward toward the clamp for retaining the grommet within the cavity.

In yet another embodiment, a method is provided for securing a damper assembly to an elongated member. A grommet is formed with a split tubular body that defines a substantially cylindrical cavity. The split tubular body has an oblong projection extending radially outward therefrom. A tubular clamp is formed that defines a cavity. The tubular clamp has a slot formed through an external surface. The grommet is inserted within the cavity and the oblong projection is inserted into the slot for securing the grommet to the tubular clamp.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figures 1, 2A, 2B:
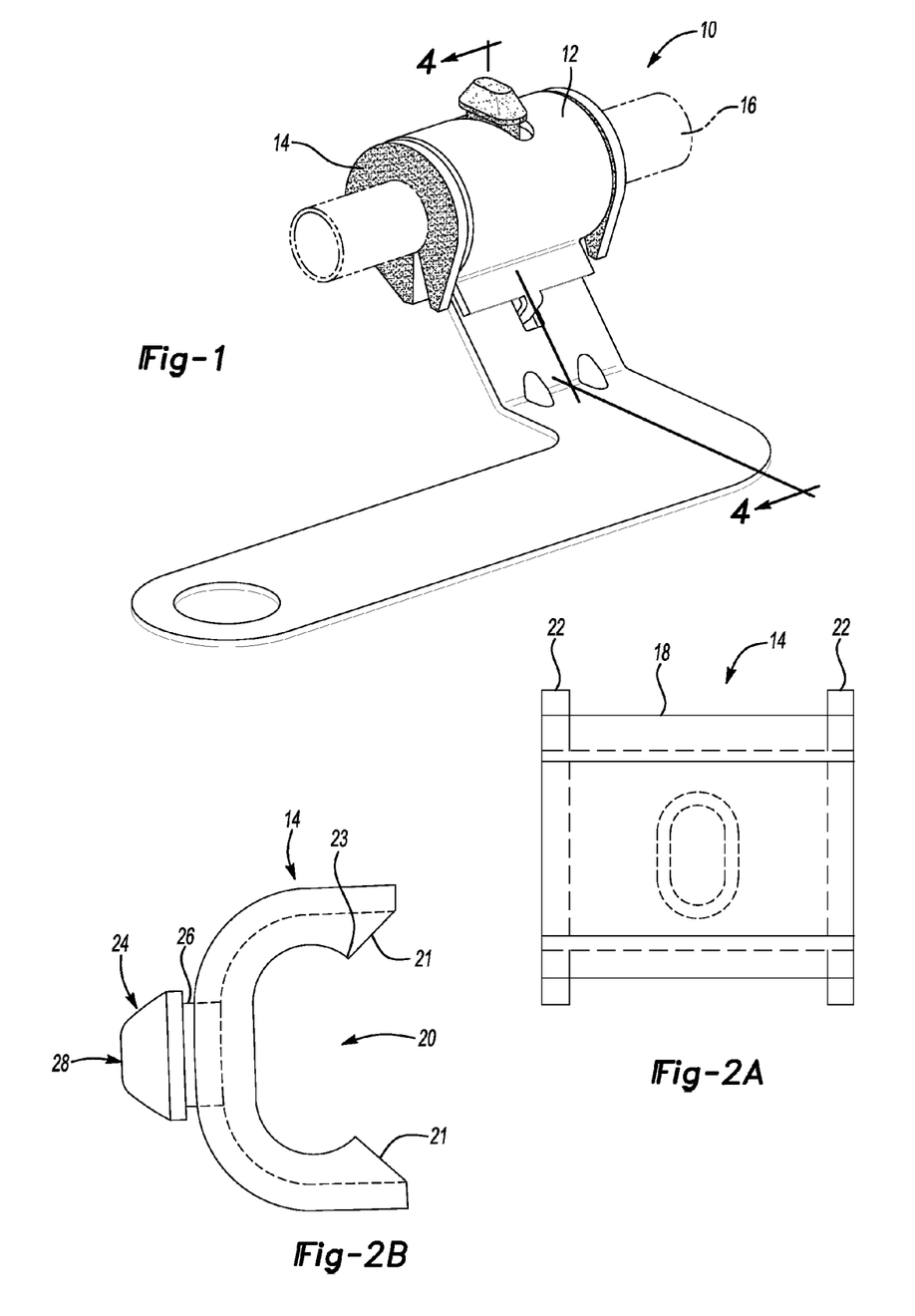
FIG. 1 is a perspective view of a wrap bracket assembly according to an embodiment of the present invention, illustrated supporting an elongated member.
FIG. 2A is a bottom plan view of a grommet of FIG. 1.
FIG. 2B is a side elevation view of the grommet of FIG. 2A.

With reference to FIG. 1, a wrap bracket assembly is illustrated in accordance with an embodiment of the present invention and is referenced by numeral 10. The wrap bracket assembly 10 includes a wrap bracket 12 assembled about a grommet 14. Once assembled, the wrap bracket assembly 10 is fastened to a supporting surface to secure a tube 16. The wrap bracket assembly 10 may be used to secure a variety of tubes including: pipes, hoses ducts, lines, cables and harnesses. An exemplary example of one such application of a wrap bracket assembly is to secure power steering lines on an automotive vehicle.

Referring to FIGS. 1-2B, the grommet 14 is sized to attach to a wrap bracket 12 and to conform to the outer diameter of the tube 16. The grommet 14 is a molded elastic material, such as EPDM, Neoprene, Silicone, HNBR, Nitrile or Viton®. The material selected for the grommet 14 will preferably have a Shore Durometer Hardness between 60-80 Shore A. The type of elastic material and the hardness may be selected based on the requirements for a specific application.

The grommet 14 is molded in an open position, providing a split tubular grommet body 18 having a partially cylindrical shape. An axially extending opening 20 is formed along the length of the body 18. The opening 20 may be formed during the mold process as opposed to cutting the opening 20 afterwards. By incorporating the opening 20 into the mold process, a pair of smooth lead-in surfaces 21 are created. The lead-in surfaces 21 each include a raised tip 23. The dimension between the opposing raised tips 23 when assembled may be less than the inner diameter of the grommet 14. The lead-in features 21 with the raised tips 23 may provide a "Snap-fit" as the wrap bracket assembly 10 engages a tube 16. This "Snap-fit" provides positive feedback to confirm proper assembly to the tube 16. In some cases this "Snap-fit" will provide a temporary locking feature for connecting the wrap bracket assembly 10 to the tube 16 prior to final assembly.

Alternative embodiments of the grommet are envisioned where the grommet is "molded closed". An opening for this grommet could be cut after the mold process.

The grommet 14 is designed such that when it is closed, as seen in FIG. 1, the body 18 assumes a generally cylindrical shape, having an ovate cross section with a circular inner diameter that forms a cylindrical cavity. A pair of flanges 22 radially extend from the body 18. An oblong projection 24 extends from a mid-portion of the body 18 in a direction that is diametrically opposite to the opening 20. The projection 24 includes a shaft 26 with an oblong tapered head 28, the width of the head 28 may be larger than that of the shaft 26.

Figure 3:
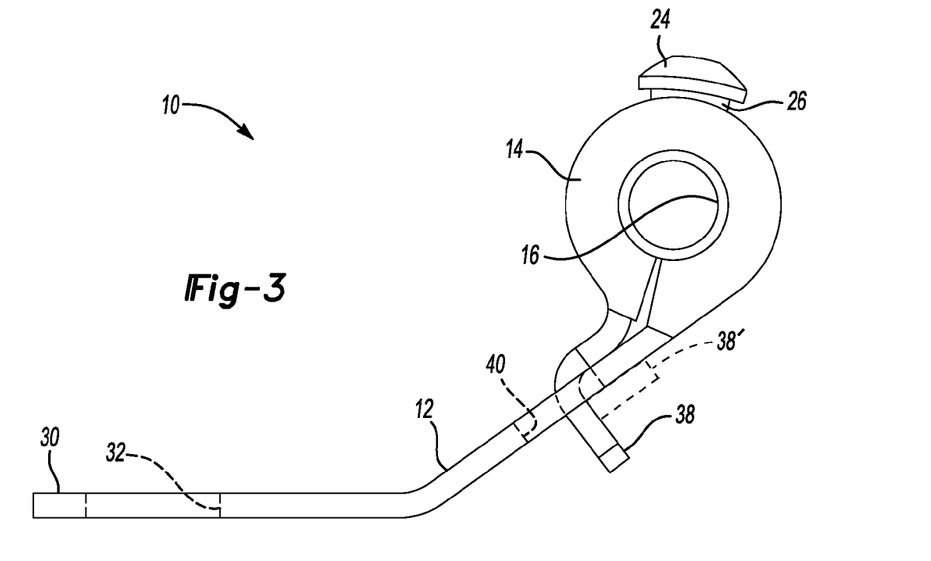
FIG. 3 is a side elevation view of the wrap bracket assembly of FIG. 1, illustrated in a closed assembly position.
Figure 4:
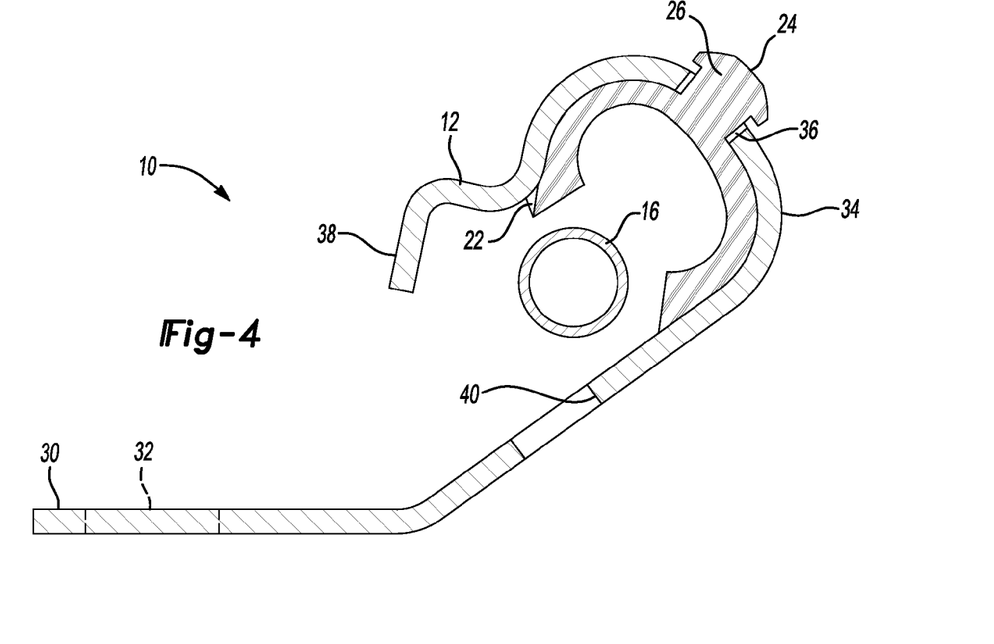
FIG. 4 is a side sectional elevation view of the wrap bracket assembly of FIG. 1, taken along the line 4-4 and illustrated in an open assembly position.

With reference to FIGS. 3-4, the wrap bracket 12 is generally a single stamping that secures a tube 16 by wrapping around it. The wrap bracket 12 includes a planar base, such as mounting portion 30 for mounting the bracket 12 to a surface. The mounting portion 30 includes a fastener aperture 32 for receiving a fastener (not shown). A clamp, such as curved portion 34 of the bracket 12 extends from the mounting portion 30. An elongated slot 36 extends through the curved portion 34. The slot 36 is sized for receiving the oblong projection 24.

The projection 24 facilitates retaining the grommet 14 within the wrap bracket 12. Projection 24 is sized such that the width of the tapered head 28 is greater than the width of the slot 36. Therefore the head 28 temporarily deforms to pass through the slot 36, and then the head 28 returns to its original shape to retain the grommet 14 to the bracket 12. The projection 24 retains the grommet 14 to the wrap bracket 12 which allows the wrap bracket assembly 10 to be shipped to a customer preassembled in an open position (FIG. 4).

The oblong shape of the projection 24 as well as the flanges 22 help locate the grommet 14 within the wrap bracket 12. The grommet 14 is sized such that the perpendicular distance between the flanges 22 is slightly larger than the width of the bracket 12, which allows the grommet 12 to nest within the curved portion 34 of the bracket 12. The oblong shape of the projection 24 prevents the grommet 14 from rotating relative to the bracket 12.

The wrap bracket assembly 10 is illustrated in a closed position in FIG. 3 and an open position in FIG. 4. The wrap bracket 12 includes a tab 38 that transversely extends from a distal end of the wrap bracket 12. A tab-slot 40 is positioned between the mounting portion 30 and the curved portion 34 for receiving the tab 38. During installation, a user engages the tube 16 with the open wrap bracket assembly 10, as illustrated in FIG. 4. Once the tube 16 is engaged the user bends the wrap bracket assembly 10 to the closed position of FIG. 3, and inserts the tab 38 into the slot 40. The tab 38 may be plastically deformed or "crimped", as shown in dashed line and referenced by numeral 38'. The closed position of the wrap bracket assembly 10 is maintained by plastic deformation of the wrap bracket 12 and/or the tab 38'.

Figure 5:
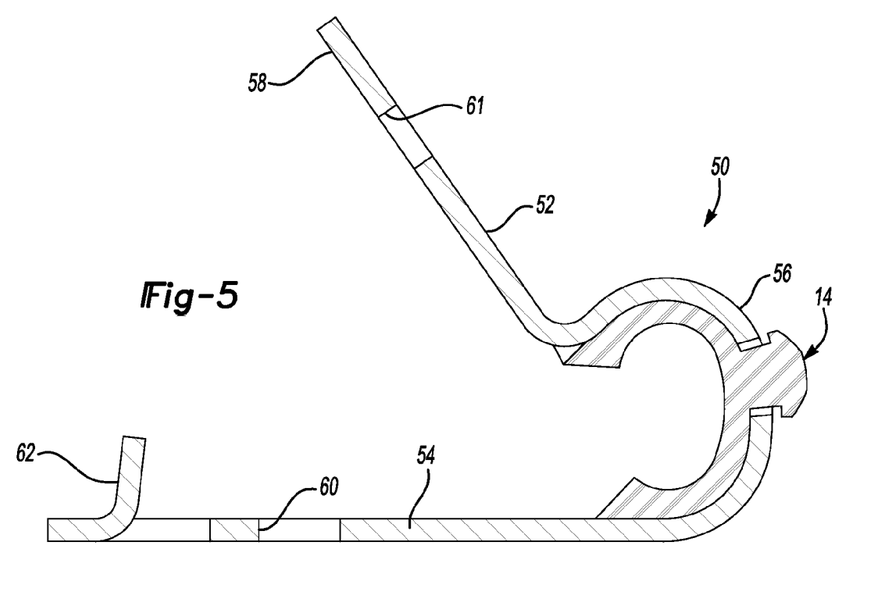
FIG. 5 is a side sectional elevation view of a wrap bracket assembly according to another embodiment of the present invention, illustrated with a "R" shaped bracket.

FIG. 5 illustrates another embodiment of the wrap bracket assembly, generally referenced by numeral 50. Wrap assembly 50 is generally a bracket that secures a tube (not shown) by wrapping around it, and includes a temporary locking feature. Wrap Assembly 50 includes an R-shaped wrap bracket 52. The bracket 52 includes a planar base, such as mounting portion 54 and a planar locking portion 58 connected to each other by a clamp, such as curved portion 56. The mounting portion 54 includes a fastener aperture 60 for receiving a fastener (not shown) to secure the wrap assembly 50 to an underlying surface. The mounting portion 54 also includes a retention tab 62 that extends in a generally upright direction therefrom. The clamp, such as curved portion 56 is sized for receiving the grommet 14. The locking portion 58 also includes a fastener aperture 61. The retention tab 62 and the locking portion 58 are sized to provide a partial interference fit between them when the assembly 50 is bent into a closed position (not shown). The interference fit provides a temporary locking feature that may be utilized during shipping or during assembly, and prior to inserting a fastener into the fastener apertures 60, 61.

Figure 6:
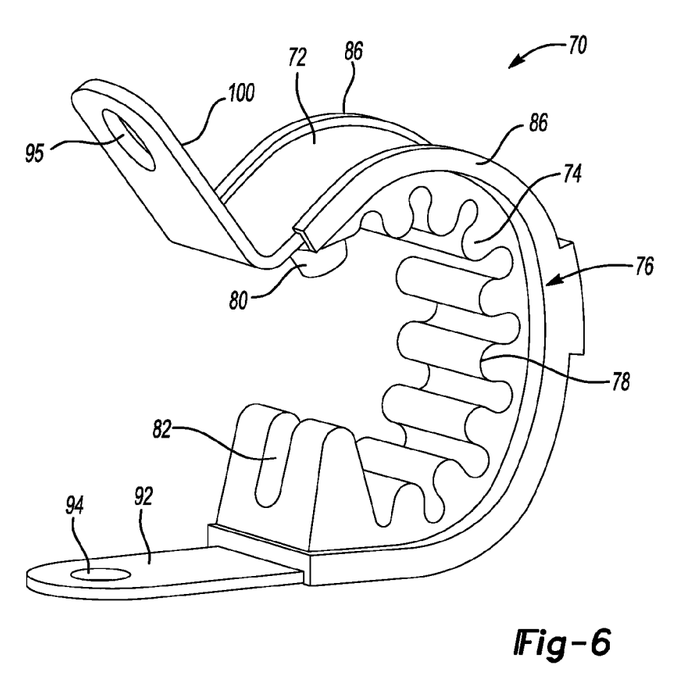
FIG. 6 is a perspective view of a wrap bracket assembly according to yet another embodiment of the present invention, illustrated in an open position.
Figure 7:
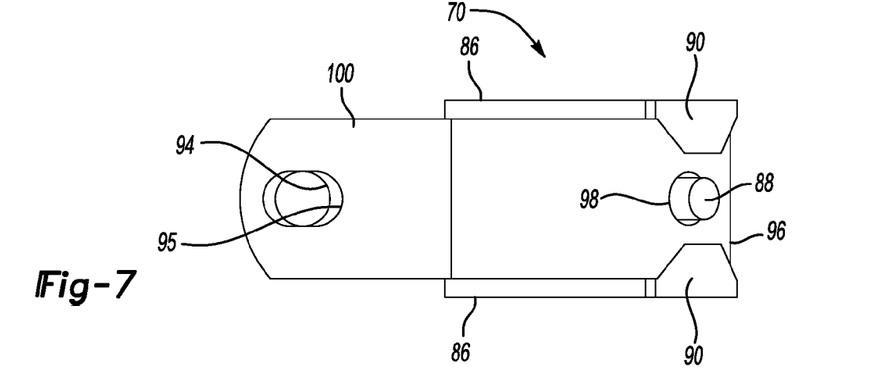
FIG. 7 is a top plan view of the wrap bracket assembly of FIG. 6.
Figure 8:
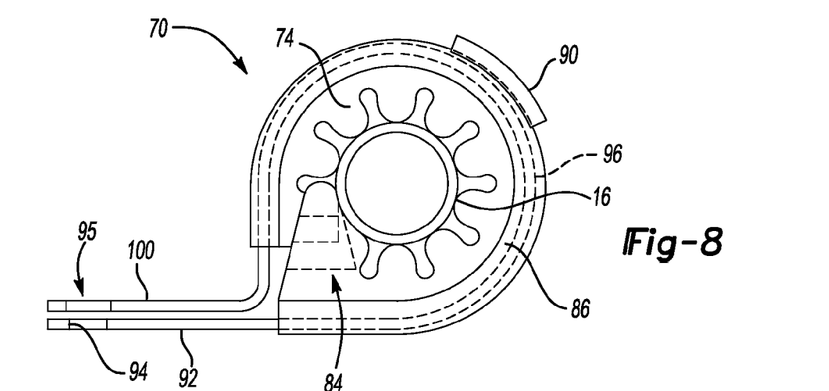
FIG. 8 is a side elevation view of the wrap bracket assembly of FIG. 6, illustrated in a closed position.

With reference to FIGS. 6-8, a wrap bracket assembly having a toothed grommet is illustrated in accordance with another embodiment of the present invention and is referenced by numeral 70. The wrap bracket assembly 70 includes a wrap bracket 72 assembled about a toothed grommet 74. Once assembled, the wrap bracket assembly 70 may be fastened to a surface to secure a tube 16 in place. The wrap bracket assembly 70 may be used to secure a variety of tubes including: pipes, hoses ducts, lines, cables and harnesses. An example of one such application of a wrap bracket assembly is to secure HVAC lines on an automotive vehicle.

The toothed grommet 74 is sized to attach to the wrap bracket 72 and to conform to the outer diameter of the tube 16. The grommet 74 is formed of a molded elastic material, such as EPDM, Neoprene, Silicone, HNBR, Nitrile or Viton®. The material selected for the grommet 74 will preferably have a Shore Durometer Hardness between 60-80 Shore A. The type of elastic material and the hardness may be selected based on requirements for a specific application.

The toothed grommet 74 is molded in an open position, providing a grommet body 76 having an elongate shape, with a transverse width and a longitudinal length. A series of transverse teeth 78 extend from the body 76. The teeth are formed to evenly engage the circumference of the tube 16. The grommet 74 includes a generally cylindrical post 80 extending from a distal end of the body 76. A notch 82 is formed at the opposite end of the body 76. The notch 82 is sized for receiving the post 80. The post 80 and the notch 82 cooperate to provide an alignment feature for the wrap bracket assembly 70. The alignment feature is positioned at an opening 84 of the wrap bracket assembly 70.

The toothed grommet 74 is designed such that when it is closed, the body 76 assumes a generally cylindrical shape, having a cross section with teeth 78 that extend radially inward to form a generally cylindrical cavity with a circular inner diameter. The height of the teeth 78 may be sized according to the outer diameter of a corresponding tube 16 (shown in FIG. 8). A pair of flanges 86 radially extend from the body 76. A cylindrical projection 88 radially extends from a mid-portion of the body 76 in a direction that is diametrically opposite to the opening 84. A pair of opposing flaps 90 extend transversely from the flanges 86 toward the projection 88.

The wrap bracket 72 is generally a single stamping that secures a tube 16 by wrapping around it. The wrap bracket 72 includes a planar base, such as mounting portion 92 for mounting the bracket 72 upon an underlying surface. The mounting portion 92 includes a fastener aperture 94 for receiving a fastener (not shown). A clamp, such as curved portion 96 of the bracket 72 extends from the mounting portion 92. The curved portion 96 includes an aperture 98 that extends through the bracket. The aperture 98 is sized for receiving the cylindrical projection 88. The bracket 72 includes a planar locking portion 100 extending from the curved portion 96. The locking portion 100 also includes a fastener aperture 95, that aligns with the fastener aperture 94 of the mounting portion 92, when the bracket assembly 70 is in the closed position (FIG. 8).

The projection 88 as well as the flanges 86 help locate the grommet 74 to the wrap bracket 72. The grommet 74 is sized such that the perpendicular distance between the flanges 86 is slightly larger than the width of the bracket 72, which allows the grommet 74 to nest within the curved portion 96 of the bracket 72. The flaps 90 help retain the grommet 74 to the bracket 72.

The wrap bracket assembly 70 is illustrated in an open position in FIG. 6 and a closed position in FIG. 8. During installation, a user engages the tube 16 with the open wrap bracket assembly 70. Once the tube 16 is engaged the user bends the wrap bracket assembly 70 to the closed position of FIG. 8. The closed position of the wrap bracket assembly 70 is partially maintained by plastic deformation of the wrap bracket 72, until the user securely mounts the assembly 70 using a fastener (not shown).

Figure 9:
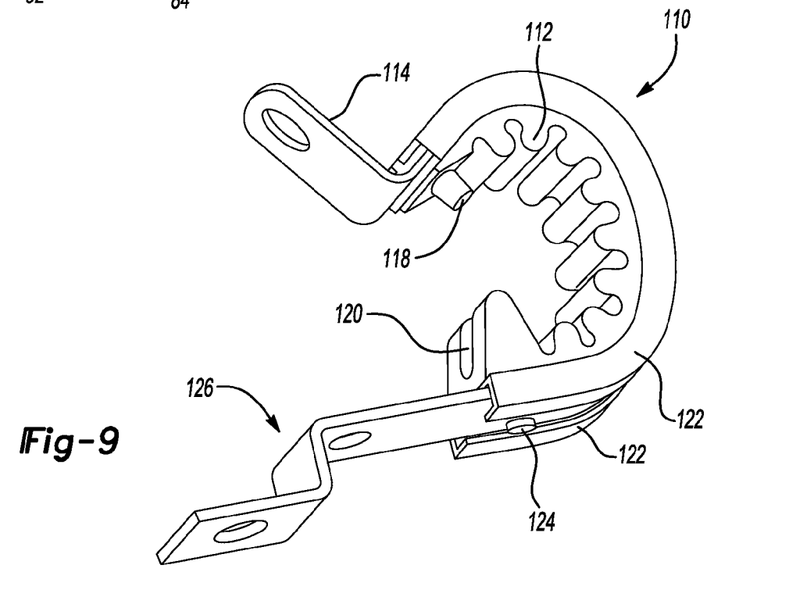
FIG. 9 is a perspective view of a wrap bracket assembly according to still another embodiment of the present invention, illustrated in an open position.

FIG. 9 illustrates yet another embodiment of the wrap bracket assembly that is generally referenced by numeral 110. This embodiment includes, a toothed grommet 112 having a pair of channels 122 extending the length of the lateral edges of the grommet 112. The channels 122 help retain the grommet 112 on a bracket 114. The grommet includes an alignment feature having a post 118 and a notch 120. Additionally a grommet post 124 outwardly extends from the grommet 112, opposite the notch 120. During assembly of the grommet 112 to the bracket 114, the channels 122 are peeled open to engage the bracket 114 and released so that the channels 122 retain the grommet 112 to the bracket 114. The mounting bracket 114 includes a step 126 to offset the grommet 112 from the underlying surface. Such an offset 126 may be used for packaging purposes, or to prevent the channels 122 or post 124 from contacting the underlying surface.

Figure 10:
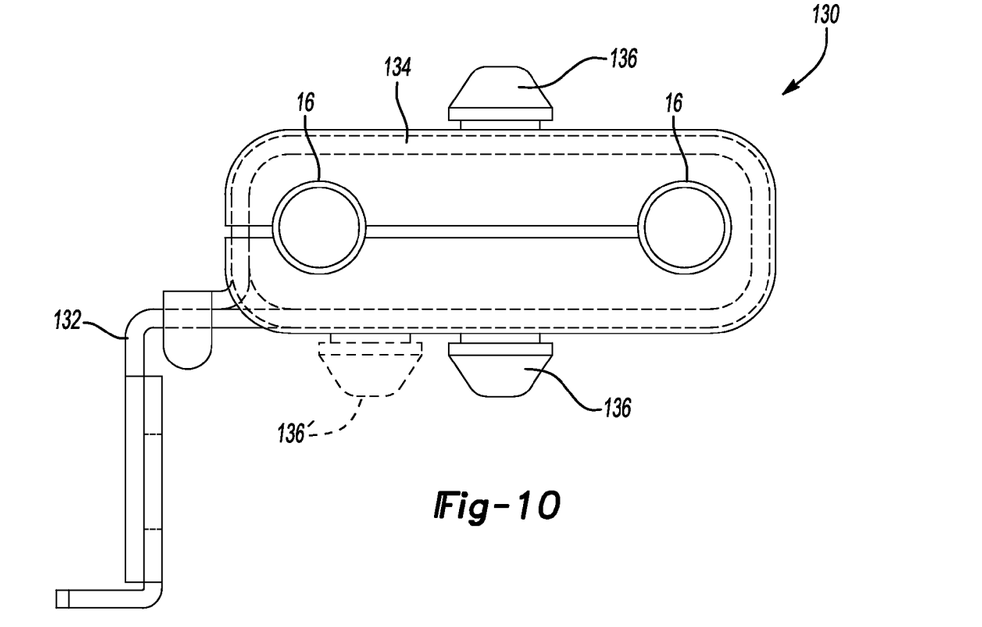
FIG. 10 is a side elevation view of a wrap bracket assembly according to another embodiment of the present invention, illustrated with a dual tube grommet having oblong projections.
Figure 11:
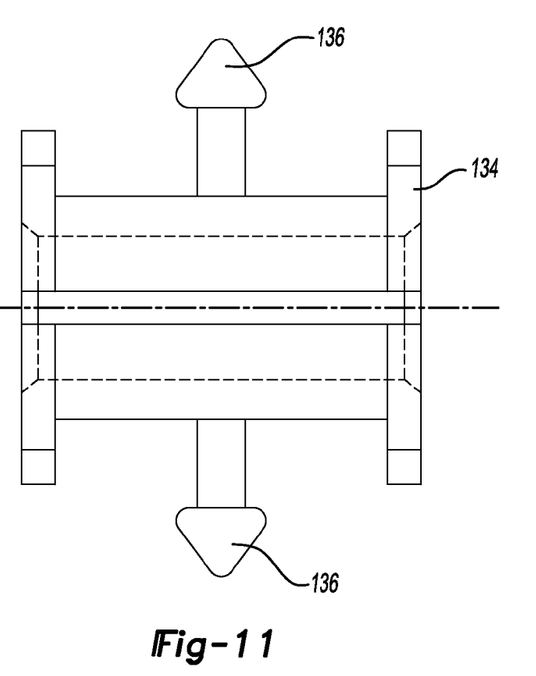
FIG. 11 is a front elevation view of the grommet of FIG. 10.

With reference to FIGS. 10 and 11, a wrap bracket assembly having a dual tube grommet with oblong projections is illustrated in accordance with another embodiment of the present invention and is referenced by numeral 130. The wrap bracket assembly 130 includes a wrap bracket 132 assembled about a dual tube grommet 134. Once assembled, the wrap bracket assembly 130 is fastened to an underlying surface to secure a pair of tubes 16. The wrap bracket assembly 130 may be used to secure a variety of tubes including: pipes, hoses ducts, lines, cables and harnesses. An example of one such application of a wrap bracket assembly 130 is to secure both the pressure and return power steering lines on an automotive vehicle.

The dual tube grommet 134 is generally rectangular in shape. The grommet 134 includes a pair of cavities projecting through the grommet 134 for receiving a pair of tubes 16. The grommet 134 also includes a pair of oblong projections 136 for securing the grommet 134 to the wrap bracket 132. The oblong projections 136 extend from opposite sides of the grommet 134. The projections 136 are received by corresponding slots (not shown) of the wrap bracket 132 for retention. Other embodiments of the wrap bracket assembly 130 include oblong projections 136 that are offset from each other (e.g., oblong projection 136'), or that include different diameter shafts, for providing a poke-yoke or assembly aide. Alternate embodiments of the wrap bracket assembly 130 envision a grommet having only one, or more than two oblong projections extending therefrom. Additional alternate embodiments envision a multi-tube grommet configured for more than two tubes, (e.g. a three or four tube grommet).

Figure 12:
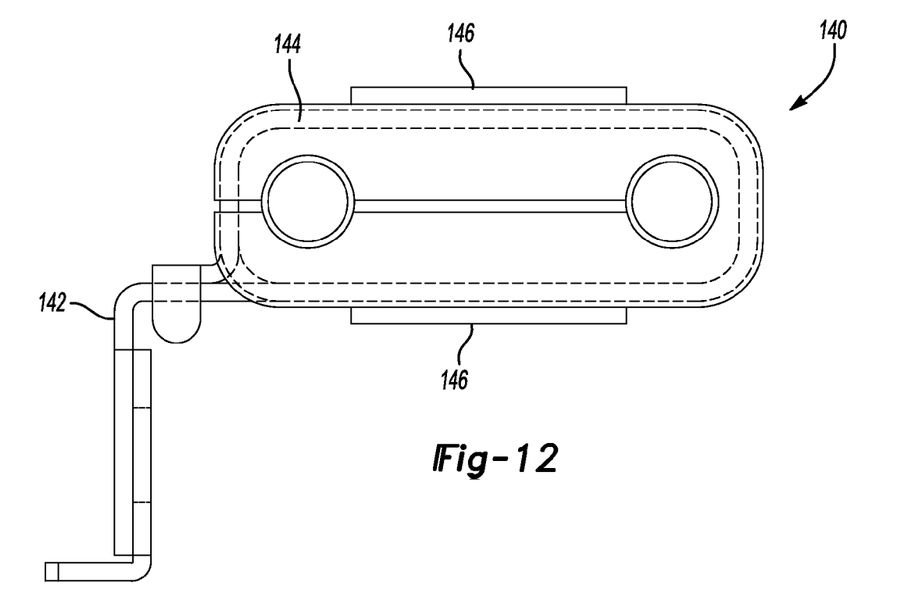
FIG. 12 is a side elevation view of a wrap bracket assembly according to another embodiment of the present invention, illustrated with a channeled dual tube grommet.
Figure 13:
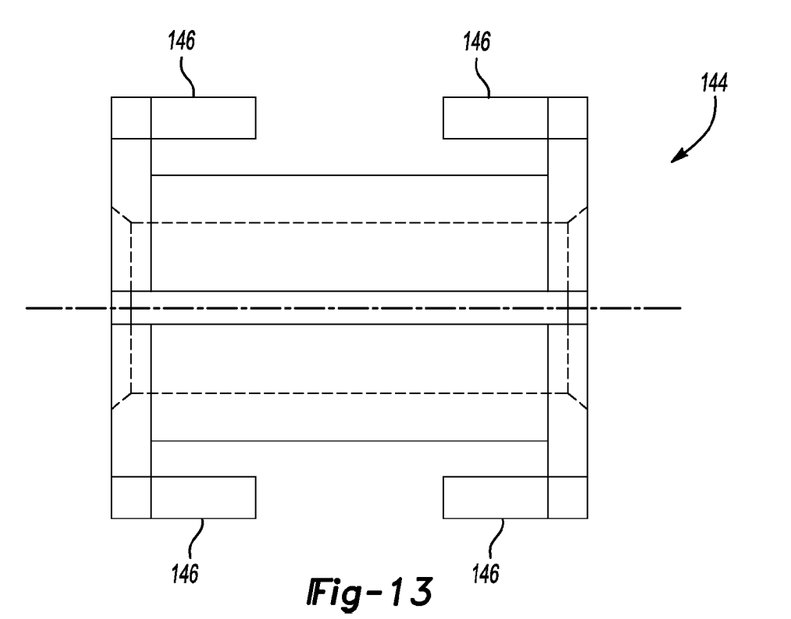
FIG. 13 is a front elevation view of the grommet of FIG. 12.

FIGS. 12-13 illustrate a wrap bracket assembly having a dual tube channeled grommet, in accordance with another embodiment of the present invention and is referenced by numeral 140. The wrap bracket assembly 140 includes a wrap bracket 142 assembled about a dual tube channeled grommet 144. The channeled grommet 144 includes a pair of channels 146 disposed over a portion of opposing sides of the grommet 144. The channels 146 help retain the grommet 144 to the bracket 142.

Figure 14:
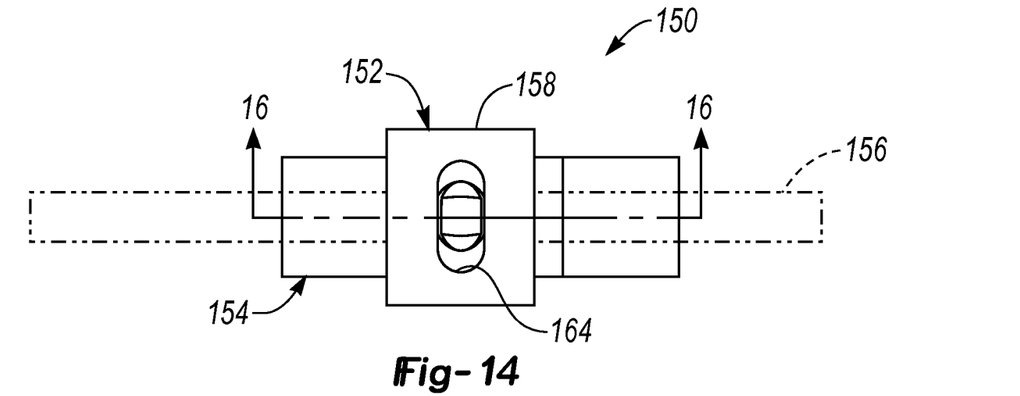
FIG. 14 is a top plan view of a damper assembly according to another embodiment of the present invention, illustrated in a closed position and secured to an elongated member.
Figure 15:
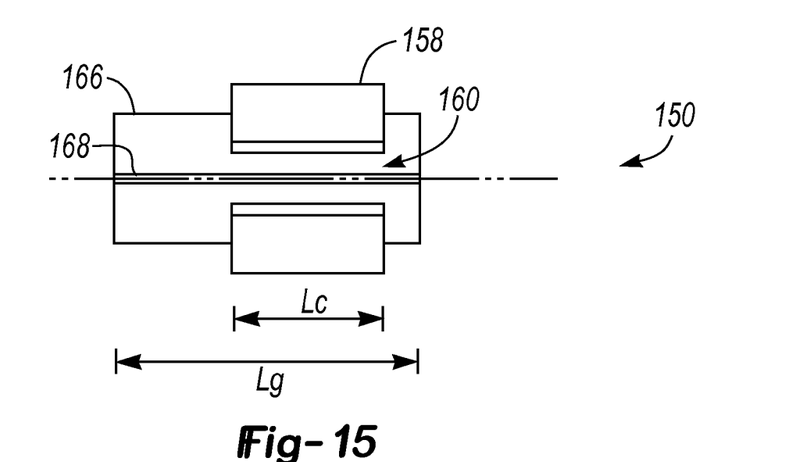
FIG. 15 is a bottom plan view of the damper assembly of FIG. 14.

With reference to FIGS. 14 and 15, a damper assembly is illustrated in accordance with another embodiment and is referenced by numeral 150. The damper assembly 150 includes a clamp 152 that is assembled around a resilient member, such as a grommet 154. Once assembled, the damper assembly 150 is coupled to an elongated member, such as a tube 156. The damper assembly 150 is similar in structure to the wrap bracket assembly 10 described above with reference to FIGS. 1-5. However, the damper assembly 150 does not secure the tube 156 to an underlying surface. Rather, the damper assembly 150 is secured to the tube and reduces or dampens oscillation of the tube 156.

Elongated members, such as the tube 156 may be excited by a frequency input, such as a force input, or other vibratory input exciting the elongated member to one of the structure's natural frequencies. Additionally, elongated members tend to have the reduced ability to self-damp a vibratory input and the elongated member may oscillate greatly without the aid of a damper. The reduced ability to self-damp and the ease of excitation of the elongated member may lead to stress fatigue, or damage of the elongated member.

The damper assembly 150 is coupled to the tube 156 to attenuate, dampen or reduce oscillations of the elongated member as well as to dissipate or absorb vibrations to reduce the dynamic response of the elongated member after excitation. The damper assembly 150 in general operates out of phase with the elongated member's motion and dissipates or absorbs vibrations and other energy.

Figure 16:
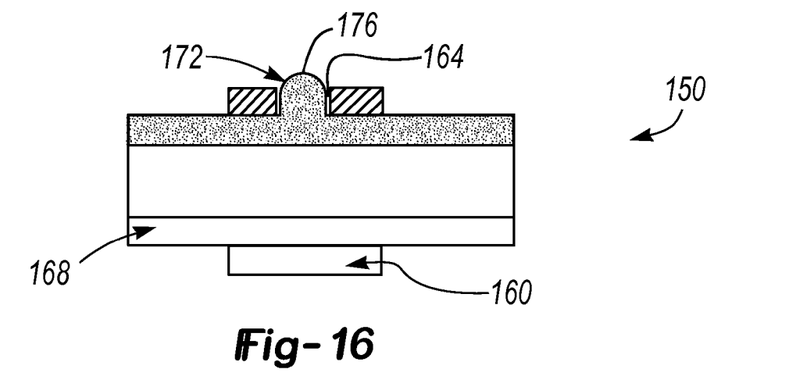
FIG. 16 is a side sectional view of the damper assembly of FIG. 14 taken along section line 16-16.

The clamp 152 is generally a single stamping that is secured to the tube 156 by wrapping around it. The clamp 152 includes a tubular body 158 with an axially extending gap 160 that is formed along a length "Lc" of the tubular body 158. The tubular body 158 is formed in a curved shape and defines a cavity 162 (shown in FIG. 17). An elongated slot 164 extends through the tubular body 158. As illustrated in FIG. 16, the elongated slot 164 is formed diametrically opposite to the axially extending gap 160 according to one or more embodiments. Further the elongated slot 164 is oriented such that a length of the elongated slot 164 extends along a circumference of the tubular body 158.

Figure 17:
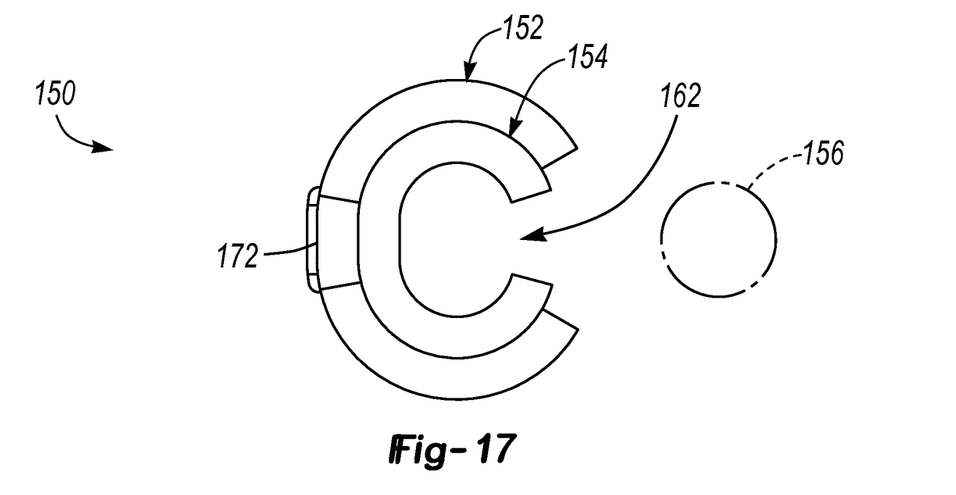
FIG. 17 is a side view of the damper assembly of FIG. 14, illustrated in an open position and adjacent to an elongated member.

The grommet 154 is sized to be received within the cavity 162 of the clamp 152 and to conform to the outer diameter of the tube 156. The grommet 154 may be molded in an open position, according to one or more embodiments, and provides a split tubular grommet body 166 having a generally cylindrical shape. An axially extending opening 168 is formed along a length "Lg" of the grommet body 166. In other embodiments, the grommet 154 is molded in a closed position, and opening 168 is cut afterwards.

Figure 18:
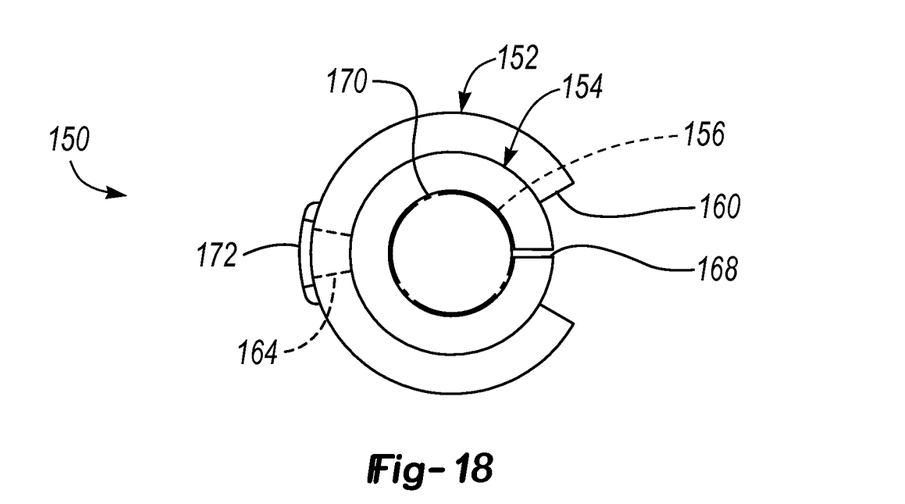
FIG. 18 is another side view of the damper assembly of FIG. 14, illustrated in the closed position and secured to the elongated member.

With reference to FIGS. 16-18, the grommet 154 is designed such that when it is closed, (FIG. 18), the grommet body 166 assumes a generally tubular shape, with a circular inner diameter that forms a substantially cylindrical cavity 170. The grommet 154 includes an integrally formed projection 172 that extends from an intermediate portion of the grommet body 166 and is received within the elongated slot 164 for locating the grommet 154 to the clamp 152. The projection 172 extends in a direction that is generally diametrically opposite to the opening 168, according to one or more embodiments. The projection 172 is formed in an oblong shape with a rounded head 176.

The oblong shape of the projection 172 helps to locate the grommet 154 within the clamp 152 such that the opening 168 of the grommet 154 aligns with the gap 160 of the clamp 152. Further, the elongated slot 164 of the clamp 152 is oriented diametrically opposite of the gap 160, and the clamp 152 is symmetrical about a transverse axis. Such orientation simplifies the assembly of the grommet 154 to the clamp 152.

The damper assembly 150 is illustrated in an open position in FIG. 17 and in a closed position in FIG. 18. The clamp 152 is formed with a c-shaped cross section that defines the cavity 162. The cavity 162 is initially formed in a substantially elliptic cylindrical shape when the clamp 152 is in the open position, as shown in FIG. 17. The grommet body 166 is molded in an open position with a cross-section that is greater than a corresponding cross-section of the cavity 162 of the clamp 152 such that the grommet 154 elastically deforms when received within the cavity 162. The grommet 154 is biased outward toward the clamp 152 for retaining the grommet 154 within the cavity 162, which allows the damper assembly 150 to be preassembled and shipped to a user in the open position as a single assembly.

Other embodiments of the wrap bracket assembly 150 are envisioned that use other features for securing the grommet 154 to the clamp 152. For example, in one or more embodiments, a width of the projection 172 is sized to engage the clamp 152 within the elongated slot 164 for securing the grommet 154 to the clamp 152. In other embodiments, the projection includes a shaft and a tapered head, such as that shown in FIGS. 1-5 for securing the grommet 154 to the clamp 152. In yet other embodiments, the projection may be cylindrical, or both the projection and the elongated slot may be rotated to differentiate between different size clamps (not shown).

During installation, a user engages the tube 156 with the open damper assembly 150, as illustrated in FIG. 17. Once the tube 156 is engaged within the grommet 154, the user bends the damper assembly 150 to the closed position of FIG. 17. The closed position of the damper assembly 150 is maintained by plastic deformation of the clamp 152 and without any additional fasteners. The clamp 152 may be plastically deformed by crimping, pinching, bending, curling, clamping, or pressing to secure the damper assembly 150 to the tube 156.

The damper assembly 150 is provided with sufficient mass to dampen vibration or oscillation of the tube to achieve the application requirements. This "tuned mass" of the damper assembly 150, places the damper assembly 150 out of phase with the frequency response of the tube 156 to minimize or reduce displacement and vibration of the tube 156 when it is subjected to an excitation frequency. The damper assembly 150 is generally configured to dampen or attenuate oscillations at predetermined frequencies.

The length (Lg) of the grommet 154 is substantially longer than the length of the clamp 152 (Lc) to prevent the tube 156 from contacting the clamp 152. For example, in the illustrated embodiment, Lg is between 10-20 mm greater than Lc. The grommet 154 may be formed of a molded elastic material, such as EPDM, Neoprene, Silicone, HNBR, Nitrile or Viton®. The material selected for the grommet 154 will be selected for durometer, vibration absorption and other performance characteristics, based on the damping performance requirements. The length, stiffness and damping performance of the grommet 154 along with the mass of the clamp 152, may be configured to provide different predetermined frequency responses. For example, the gage or thickness of the clamp 152 and/or the length of grommet 154 may be adjusted to provide a different frequency response. For example, FIG. 14 illustrates a grommet 154 that is generally symmetrical about the projection 172 and extends an equal distance beyond the clamp 152 in both directions. However, FIG. 15 depicts a modified grommet 154 having a shorter length on the right side of the clamp 152.

The damper assembly 150 may be used to dampen oscillation present in a variety of tubes including: pipes, hoses ducts, lines, cables and harnesses. For example, one such application of the damper assembly 150 is for damping high pressure fuel lines on an automotive vehicle. Such damping may allow for smaller gauge tubing to be used in an application. Further, such damping may reduce noise, vibration and harshness (NVH) present in the vehicle.

While embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A damper assembly comprising:
a grommet having a split tubular body defining a substantially cylindrical cavity for receiving an elongated member, the split tubular body having an oblong projection extending radially outward therefrom; and
a tubular clamp defining a cavity for receiving the grommet within, the tubular clamp having an axially extending gap and a slot formed through, wherein the slot is sized for receiving the oblong projection for locating the grommet to the tubular clamp, and wherein the tubular clamp is configured to plastically deform from an open position in which the gap is larger than a diameter of the elongated member to a closed position in which is the gap is smaller than the diameter to secure the grommet to the elongated member;
wherein a longitudinal length of the grommet extends substantially beyond a length the tubular clamp for damping vibration of the elongated member.

2. The damper assembly of claim 1 wherein the oblong projection is sized to engage the tubular clamp within the slot for securing the grommet to the tubular clamp.

3. The damper assembly of claim 1 wherein the oblong projection is oriented diametrically opposite to the axially extending gap.

4. The damper of claim 1 wherein the grommet further comprises an axially extending opening that is aligned with the axially extending gap of the tubular clamp for receiving the elongated member.

5. The damper assembly of claim 1 wherein the tubular clamp is configured to secure the grommet to the elongated member without a fastener.

6. A damper assembly comprising:
a clamp formed in a curved shape that defines a cavity, the clamp having a slot formed through; and
a grommet received within the cavity of the clamp, the grommet having a split tubular body that defines a substantially cylindrical cavity when oriented in a closed position for supporting a tube, the split tubular body having a projection extending radially outward therefrom and received by the slot for locating the grommet relative to the clamp, wherein the grommet is formed in an open position with a cross-section that is greater than a corresponding cross-section of the cavity of the clamp such that the grommet elastically deforms when received within the cavity and is biased outward toward the clamp for retaining the grommet within the cavity.

7. The damper assembly of claim 6 wherein the clamp is formed with a c-shaped cross section that defines a generally elliptic cylindrical cavity when oriented in an open position.

8. The damper assembly of claim 6, wherein the clamp is formed with a c-shaped cross section that defines a generally circular cylindrical cavity when oriented in a closed position.

9. The damper assembly of claim 6 wherein the clamp is secured to the tube without a fastener.

10. The damper assembly of claim 6 wherein the grommet has a longitudinal length that is substantially longer than a longitudinal length of the clamp.

11. The damper assembly of claim 6 wherein the projection further comprises tapered head with a base extending beyond a width of the slot for retaining the grommet to the clamp.

12. The damper assembly of claim 6 wherein the grommet is configured to receive an elongated member within the split tubular body, and wherein the clamp is configured to plastically deform from an open position in which a gap of the slot is larger than a diameter of the elongated member to a closed position in which is the gap is smaller than the diameter to secure the grommet to the elongated member.

13. A method of securing a damper assembly to an elongated member, the method comprising:
forming a grommet having a split tubular body defining a substantially cylindrical cavity, the split tubular body having a projection extending radially outward therefrom; and
forming a one-piece tubular clamp that defines a cavity, the tubular clamp having a slot formed through an external surface, wherein the clamp is formed in an open position in which a gap of the slot is larger than a diameter of the elongated member;

inserting the grommet within the cavity;

inserting the projection into the slot for locating the grommet relative to the tubular clamp;

receiving the elongated member within the substantially cylindrical cavity of the grommet; and plastically deforming the clamp from the open position to a closed position in which the gap is smaller than the diameter of the elongated member to secure the damper assembly to the elongated member.

14. The method of claim 13 wherein the step of forming the grommet further comprises molding the grommet in a closed position.

15. The method of claim 14 further comprising cutting the grommet lengthwise to provide the split tubular body.

16. The damper assembly of claim 6, wherein the clamp is a one-piece clamp.

17. The method of claim 13, wherein the step of forming the grommet includes forming the projection in a location that is diametrically opposite to a split in the split tubular body.

18. The method of claim 13 wherein the step of forming the grommet further includes molding the grommet in an open position wherein the grommet is formed with a cross-section that is greater than a corresponding cross-section of the cavity of the clamp such that the grommet elastically deforms when received within the cavity and is biased toward the clamp for retaining the grommet within the cavity.

* * * * *